United States Patent Office 3,198,288
Patented Aug. 3, 1965

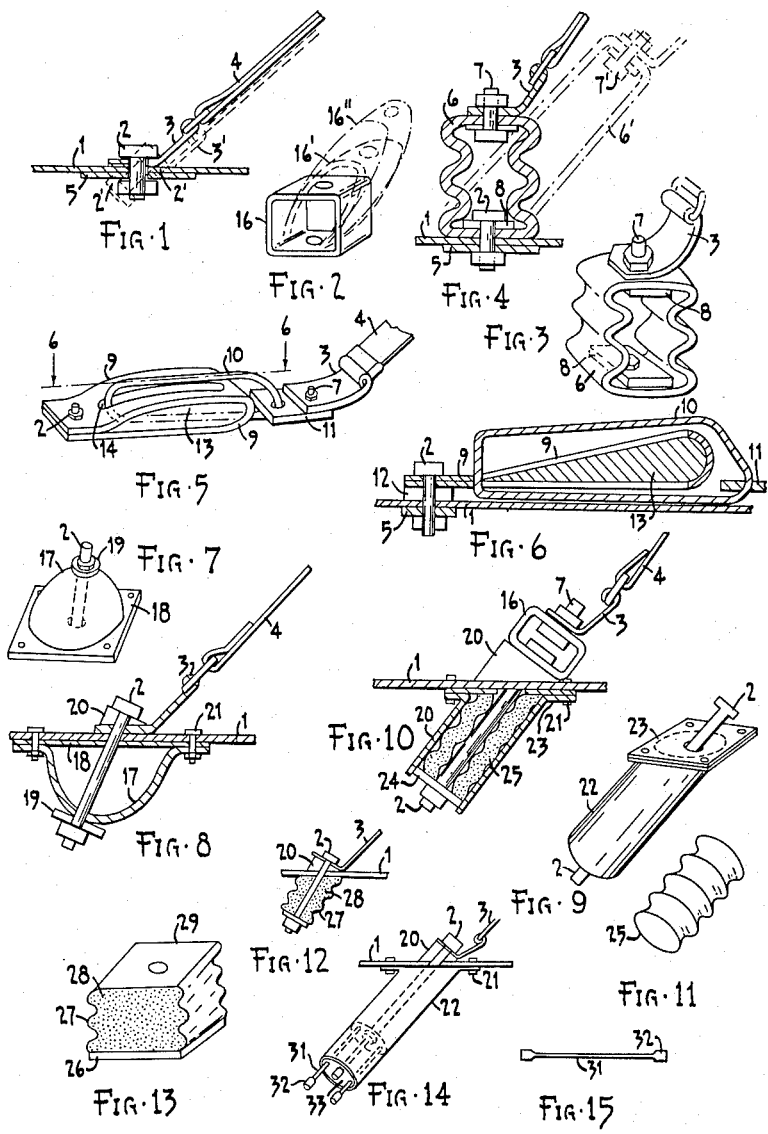

3,198,288
IMPACT ENERGY ABSORBER
Peter Presunka, Ottawa, Ontario, Canada, assignor to Mary Presunka, Fort William, Ontario, Canada
Filed Apr. 4, 1962, Ser. No. 185,161
3 Claims. (Cl. 188—1)

This invention relates to impact energy absorbing linkages, which are connected into the holding members which are used to secure cargo or personnel to the vehicle so as to insure these against damage or injury.

Prior art devices use either rigid linkages, resiliently yielding ones, or non-extensible flexible ones, or a combination of the above, to reduce the severity of impact shocks. None of these devices are primarily impact energy absorbers which would yield under load and so absorb energy, without returning that stored energy to the subject cargo or personnel in very quick order and in so doing generating deleterious forces on the subject.

The resilient shock absorbers thus store energy above a certain level of impact force and then return it to the subject when the impact force level drops below that level. When this energy is being returned from the resilient holding member to the subject, it generates forces which are additive with those impressed on the subject by the vehicle. The net effect is such that the impact force is somewhat smoothed out, without very sharp impact force peaks which may be generated in a crash.

The stopping time is not generally lengthened by these resilient members, because recovery time of these members is closely related to their holding strength. The greater the holding or resisting strength, the shorter is the energy return rate, or "kick-back." This "kick-back" or recovery time of these resilient members is usually shorter than the stopping time of the vehicle under crash conditions, and their ability to lengthen out the stopping time of the subject is very limited, and largely negligible. The net result of the resilient holding members is to smooth out the sharp impact peak forces; but the subject is still subjected to the full impact energy within the vehicle stopping distance.

The more easily damaged cargo and personnel in general require a substantial reduction in the impact energy and a substantial increase in the stopping time to enable them to survive most crashes, except those of the most violent nature.

Since these impact energy absorbing linkages are inserted into the holding members which usually are flexible webbing or metal straps or rods, these impact absorbing devices must be rugged, compact, economical and simple in operation. These devices may be inserted into the length of the holding member or between the holding member and the vehicle, or between the cargo and the holding member.

The present embodiment illustrates this device in its application to the safety belt anchorages; and the most convenient location for this impact absorbing device, is the vehicle floor. In all the variants of this device both couplings are of a rigid nature, one rigid face of the device bolts to the vehicle floor, and the other face is also rigid and is secured to the bolt to which the safety belt bracket is connected and which bolt resists the impact load. These impact absorbing linkages are thus subjected either to compressive or tensile stresses, which exist between the vehicle floor and the safety belt anchoring bolt.

Where these linkages are to be inserted into the length of a flexible holding member, each of the two coupling faces will require a bracket around which the flexible holding member may be looped or otherwise fastened; this may also require some modification in the outer body structure and some additional, rugged packaging of these devices but this would fall into the scope of ordinary skills.

The object of this invention is therefore, to provide an impact energy absorbing linkage which may be inserted into the holding members, so as to substantially reduce the average-out value of impact force between some predetermined range of values, to reduce the peak impact forces which may be present, and to lengthen the stopping time and stopping distance of the subject secured to the vehicle by the holding members.

The application, operation and usefulness of the invention will become more readily apparent by a recourse to the following drawings submitted:

FIG. 1 shows the anchorage of an ordinary safety belt to the vehicle.

FIG. 2 is a three dimensional sketch of a simple, open cubic shell type of impact absorber.

FIG. 3 is a 3-dimensional sketch of an open cube shell with undulating load wall members.

FIG. 4 is a section through the mounting bolts of the open cube of FIG. 3.

FIG. 5 is a 3-dimensional sketch of a lead-in-shear impact absorbing linkage.

FIG. 6 is a section through the long axis of the linkage in FIG. 5.

FIG. 7 is a 3-dimensional sketch of a sphere shaped impact absorber.

FIG. 8 is a section through the central mounting bolt of FIG. 7.

FIG. 9 is a 3-dimensional sketch of a cylindrical compression linkage.

FIG. 10 is a section through the device of FIG. 9 and through other associated mounting means.

FIG. 11 is a 3-dimensional sketch of an undulating wall cylindrical sleeve used in the device of FIG. 9.

FIG. 12 is a 3-dimensional sketch of a composite device showing a cubical metal shell filled with crushable material.

FIG. 13 is a section through the central mounting bolt of the device in FIG. 12.

FIG. 14 is a section through a cylindrical device using extensible tension members with two cylinder ends sketched in 3 dimensions.

FIG. 15 is a section through one of the extensible tension members shown in FIG. 14.

FIG. 1 illustrates the mechanical features of the usual safety belt anchored to the vehicle floor. The vehicle floor 1 is reinforced with a steel plate 5, and stud 2 secures the safety belt metal plate 3 to the reinforced vehicle floor. In the event of an intense tension stress on the safety belt 4, the bolt 2 will be twisted out of its mounting as shown in solid lines and will tend to assume the position indicated in dotted lines. The first stresses will place the bolt 2 under an intense shear, and the vehicle floor will present a very rigid anchorage before any twisting of the bolt takes place. This jolt or pull will generate a very violent impact shock in the belt webbing which will be transmitted to the passenger behind the belt. To reduce the violence of this sheer stress the impact absorbing devices shown in FIGS. 2 and 3 may be used. These cubic shells will deform diagonally, and in so doing will absorb some impact energy, and provide additional stopping distance. These shell structures 16 in FIG. 2 and 6 in FIG. 3 apply the load more evently about the head of the bolt 2, and reduce stress concentration in it, and make it unnecessary to weld the reinforcing place 5 to the vehicle floor 1, since no intense shear stress is generated as a result of a sharp pull on the safety belt webbing 4.

The cube-shaped shell structures of FIGS. 2 and 3 will deform in a succession of ways and under progressively increasing loading, making these simple linkages very effective as impact energy and shock absorbers. Since these linkages are part of the holding members (the safety belt is attached to them), they must not be permitted to fracture or fail to the extent that the passenger may hit the vehicle or other solid object before the greater part of impact energy had been dissipated in the process, or before the increased, stopping time and stopping distance had effectively reduced the averaged-out impact force on the passenger. This requirement can be easily ensured by the use of a tough dutile metal, like annealed copper, and by making the cross-sectional area of the walls of these shell linkages sufficiently great to avoid any such possibility. The eminent suitability of annealed copper may be gathered from its low initial yield point of 3300 lbs. per sq. inch and an ultimate strength point of 32,000 lb. per sq. inch. The elongation in this range of yielding is well over 50 percent. If a combined cross section of the two walls of the above shell structures in designed to be one third of a square inch, it would begin yielding under a tensile stress of slightly over 1000 lbs. and continue extending under increasingly greater tensile stresses until a value of over 8000 lbs. is reached, at about which point it would fail by rupturing. This is well above the force for which the safety belts are designed.

To introduce yielding or shock absorbing at a lower value than the yield point of the structure under tension, the cube shaped shell 16 in FIG. 2 may be given a large initial width, which would be converted into an elongation of the shell form as shown in dotted lines 16' under half that tension. As a further extension of deforming range, the walls 6 in FIG. 3 may be undulated, and these undulations will be pulled straight before the yield point, after which the more substantial extension under tension will take place. The extent of required elongation may be controlled by the length of the load bearing walls, by the depth of undulations, as well as by the magnitude of the cross sectional area of the walls.

The impact absorbing linkage of FIG. 5 utilizes the malleable nature of lead and the right closed bar 10 shears the lead inside the jacket 9 inside its volume 13. The closed bar 10 is connected by strap metal 11 and bolt 7 to the safety belt metal plate 3, and it is pulled along the slot 14 which exposes a central strip of lead zinc or solder to the shearing action of the bar 10. This slot also determines the limit of the yielding of the linkage. The lead is wedge shaped, to extend the range of its operation over the useful range of impact forces. The cross-section of the bar 10 which sweeps out a volume of lead by shearing should be great enough to insured that the temperature rise which will be generated by the adsorption of energy in this shearing action will not raise this volume of lead above its melting point. This again may depend on the melting point of the particular type of lead used, or other similarly acting metal, as well as on the actual volume of malleable metal sheared out. FIG. 6 illustrates in section this device and its attachment to the vehicle floor.

FIGS. 7 and 8 illustrate an impact absorbing linkage which consists of a sphere shaped shell of tough and ductile metal which will crush progressively its spherical wall structure under progressively increasing loading. The spherical shell 17 may be held by a plate 18 against the vehicle floor. This plate 18 may overlie the outer floor. This plate 18 may overlie the outer flange of this sphere only, as shown in dotted lines in FIG. 7, or it may be made integral with it. This spherical structure permits the holding bolt 2 to exert a normal tensile load against the surface of this shell by a wide rigid flat washer 19. The flat wedge shaped washer 20 may be used to slope the bolt 2 closer in line with the belt 4, so that the load on the bolt is largely tensile, with a very small shear producing component. A crushable sleeve, such as shown in FIG. 11 may be inserted on the bolt 2 into the spherical shell to increase its energy absorbing capacity. This sleeve of FIG. 11 has a cylindrical shape and its walls are undulated so as to control its collapsing in a predetermined manner. Malleable metal such as lead would be suitable to use, since it would not form into a rigid seam during its deformation under compression, but would deform to the point of liquefaction.

In FIG. 9 is shown a cylindrical capsule 22 within which are crushed an assembly of undulated walled cylindrical sleeves, such as shown in FIG. 11. This capsule has an open end into which are inserted suitable assembly of crushable sleeves 25 over a bolt 2 and these crushable sleeves are compressed by the rigid flat washer 24 within the volume of the capsule 22. The assembly of sleeves 25, may be made up from different lengths to insure a progressively increasing range or impact absorption. In FIG. 10 is shown another impact absorbing device 16, connected in series. The wedge shaped washer 20 permits a sloping mounting of the bolt 2 so as to reduce the shearing stresses, and to permit the tensile load to be transmitted readily to the impact absorbing linkage. The open cube structure 16 will reduce any shearing stresses as well as increase the impact absorbing capacity of the combination shown in section in FIG. 10. The impact absorbing range of the crushable sleeves 25 included in the volume of capsule 22 may include both the total collapsing of the solid sleeves as well as their liquid state, which may be forced through the small openings around the bolt 2.

The tension linkage shown in FIG. 14 consists of a number of pairs of extensible rods 31 which are stretched inside the cylinder 22 between its fixed end 33 and an axially moving face 34 which is bolted to the end of stud 2 to which the safety belt is connected by a metal bracket 3. These extensible rods are made of a tough, ductile metal, like copper, with a low initial value of yielding and a very high ultimate strength and a high percentage elongation. These rods may be arranged symmetrically in pairs about the centre of the face 34, and arranged to have different-length pairs so that smoothness of impact absorption would be insured as well as the limiting extension traverse of the moving face 34. In FIG. 15 is shown a section through one such extensible load bearing element.

A composite compression linkage is shown in FIGS. 12 and 13. FIG. 12 shows a 3-dimensional sketch of an open cubic shell filled with a crushable rigid filler material 28, which will crush between predetermined loading values when the faces 26 and 29 are compressed under the action of a bolt 2 under loading from a safety belt bracket 3. The under face 26 must be sufficiently rigid to apply the load evenly over its entire area, while face 29 is sloped so that the bolt 2 may be aligned with the safety belt tensile loading. A wedge washer 20 enables this type of mounting to be made very conveniently. The undulated walls 27 may be made of a ductile or malleable metal to increase the impact absorbing capacity of the linkage as well as to give it sufficient initial rigidity, since the filler material may possess a very low initial compressive resistance. The resistance to crushing of rigid foams, such as polyurethanes increases rapidly as the crushing progresses, thus insuring a substantial range of loading under which it will function.

It will also be obvious that a combination of the above described linkages may be employed, so as to increase the range of impact absorption and to increase the stopping time and stopping distance.

The permissible stopping distance will depend on the safe available space in front of the passenger using the safety belt webbing.

These linkages may be employed to anchor the vehicle seats to the vehicle frame. Such energy absorbing connection would prevent such seats from breaking loose, and may point to a different approach to safety belt attachments. If the vehicle seats were attached in such a manner as to incorporate sufficient yielding in their attachments to the vehicle frame, then the safety belting may take the form of wide webbing which would secure the passenger to his seat over a very large portion of his body. In case of impact, the vehicle seat would provide for this yielding in its attachment to the vehicle frame, and the passenger may then be safely strapped to such a specially designed seat structure.

The above described devices, may therefore be easily adapted to provide a yielding attachment of vehicle seats to the vehicle frame, so that the seats will possess an additional stopping time and stopping distance within the vehicle. Some of these impact absorbing linkages have also been shown in connection with the applicant's copending application, Serial No. 178,858 on a "Safety Crash Tray," but these were not claimed as such, except in combination with the device described.

It will also be quite obvious that with such impact absorbers connected into the holding members, whether they are safety belts or others, the peak impact forces will be eliminated entirely, and these holding members will not require the presently designed excessive strength specifications, which run up to 10,000 lb. pull on the webbing.

It is also almost a certainty that the human tolerance limit to impact forces does not run as high as these designed strength specifications. The inventor strongly believes that the above described impact absorbing linkages will greatly extend the range of crash conditions under which the presently designed safety webbing may provide protection to its users.

I claim:

1. An impact energy absorber for use in coupling restraining means in a vehicle, said impact absorber comprising: a first member adapted to be secured to said vehicle; a second member adapted to be secured to said restraining means; means providing limited relative movement of one of said members with respect to the other; and a malleable element inserted into and supported along two sides and one end by one of said members and adapted to be deformed by the passing of the other of said members therethrough in response to a substantial tensile force impressed between said vehicle and said restraining means.

2. An impact energy absorber for use in coupling restraining means in a vehicle comprising: a first member adapted to be secured to said vehicle; a second member adapted to be secured to said restraining means; means providing limited relative movement of one of said members with respect to the other; and a malleable element inserted into and supported along two sides and one end by said first member and adapted to be deformed under compressive force exerted by the movement of the second member therethrough in response to a substantial tensile force impressed between said vehicle and said restraining means.

3. An impact energy absorber as set forth in claim 1 wherein said malleable element is formed of a metal more readily deformable than that of said members.

References Cited by the Examiner

UNITED STATES PATENTS

| | | | |
|---|---|---|---|
| 1,696,429 | 12/28 | Christen | 188—1 |
| 2,156,294 | 5/39 | Kessenich | 188—1 |
| 2,857,056 | 10/58 | Dilworth | 188—1 |
| 3,026,972 | 3/62 | Hendry | 188—1 |
| 3,089,564 | 5/63 | Smittle | 188—1 |

FOREIGN PATENTS 1,105,404  6/55  France.

ARTHUR L. LA POINT, *Primary Examiner.*

FRANK B. SHERRY, DUANE A. REGER, *Examiners.*

UNITED STATES PATENT OFFICE
CERTIFICATE OF CORRECTION

Patent No. 3,198,288

August 3, 1965

Peter Presunka

It is hereby certified that error appears in the above numbered patent requiring correction and that the said Letters Patent should read as corrected below.

In the grant, line 2, for "assignor to Mary Presunka, of Fort William, Ontario, Canada," read -- assignor of one-third to Mary Presunka, of Fort William, Ontario, Canada, --; line 11, for "Mary Presunka, her heirs" read -- Peter Presunka and Mary Presunka, their heirs --; in the heading to the printed specification, lines 3 and 4, for "assignor to Mary Presunka, Fort William, Ontario, Canada" read -- assignor of one-third to Mary Presunka, Fort William, Ontario, Canada --.

Signed and sealed this 22nd day of February 1966.

(SEAL)
Attest:

ERNEST W. SWIDER
Attesting Officer

EDWARD J. BRENNER
Commissioner of Patents